(No Model.) 2 Sheets—Sheet 1.

O. W. BENNETT.
AUTOMATIC GAS GENERATOR.

No. 336,378. Patented Feb. 16, 1886.

WITNESSES

INVENTOR
Orson W. Bennett,
by F. L. Browne
Attorney (No Model.) 2 Sheets—Sheet 2.

O. W. BENNETT.
AUTOMATIC GAS GENERATOR.

No. 336,378. Patented Feb. 16, 1886.

WITNESSES
INVENTOR
Orson W. Bennett,
by F. L. Browne
Attorney

UNITED STATES PATENT OFFICE.

ORSON W. BENNETT, OF WASHINGTON, DISTRICT OF COLUMBIA, ASSIGNOR OF ONE-HALF TO JOHN SHERMAN, OF SAME PLACE.

AUTOMATIC GAS-GENERATOR.

SPECIFICATION forming part of Letters Patent No. 336,378, dated February 16, 1886.

Application filed October 24, 1885. Serial No. 180,847. (No model.)

*To all whom it may concern:*

Be it known that I, ORSON W. BENNETT, a citizen of the United States, residing at Washington, in the District of Columbia, have invented certain new and useful Improvements in Automatic Gas-Generators; and I do hereby declare the following to be a full, clear, and exact description of the invention, such as will enable others skilled in the art to which it appertains to make and use the same.

My invention relates to that class of improvements of gas apparatus for enriching illuminating-gas or generating illuminating-gas by the mixture of atmospheric air and the vapor of hydrocarbon, and to insure an automatic, certain, and regular supply of hydrocarbon to the generating-chambers, and to govern the desired quantity of vapor of hydrocarbon in its admixture with gas or air.

To this end it is the object of my invention to produce a safe, simple, compact arrangement of the various devices used.

The main features of my invention are embodied in the relative arrangement of the liquid-reservoir with the generating-chambers, the manner of controlling the supply of liquid thereto, in the internal construction of the generating-chambers, including the means for distributing the fluid thereto and the circulation of the same therein, the arrangement and connection of the inlet and outlet pipes with the generating-chambers, and the circulation of gas or air therein; also, the devices used in disposing of any residuum which may collect in the chambers.

To these ends my invention consists in the improved construction, which I will now proceed to describe in detail.

Figure 1:
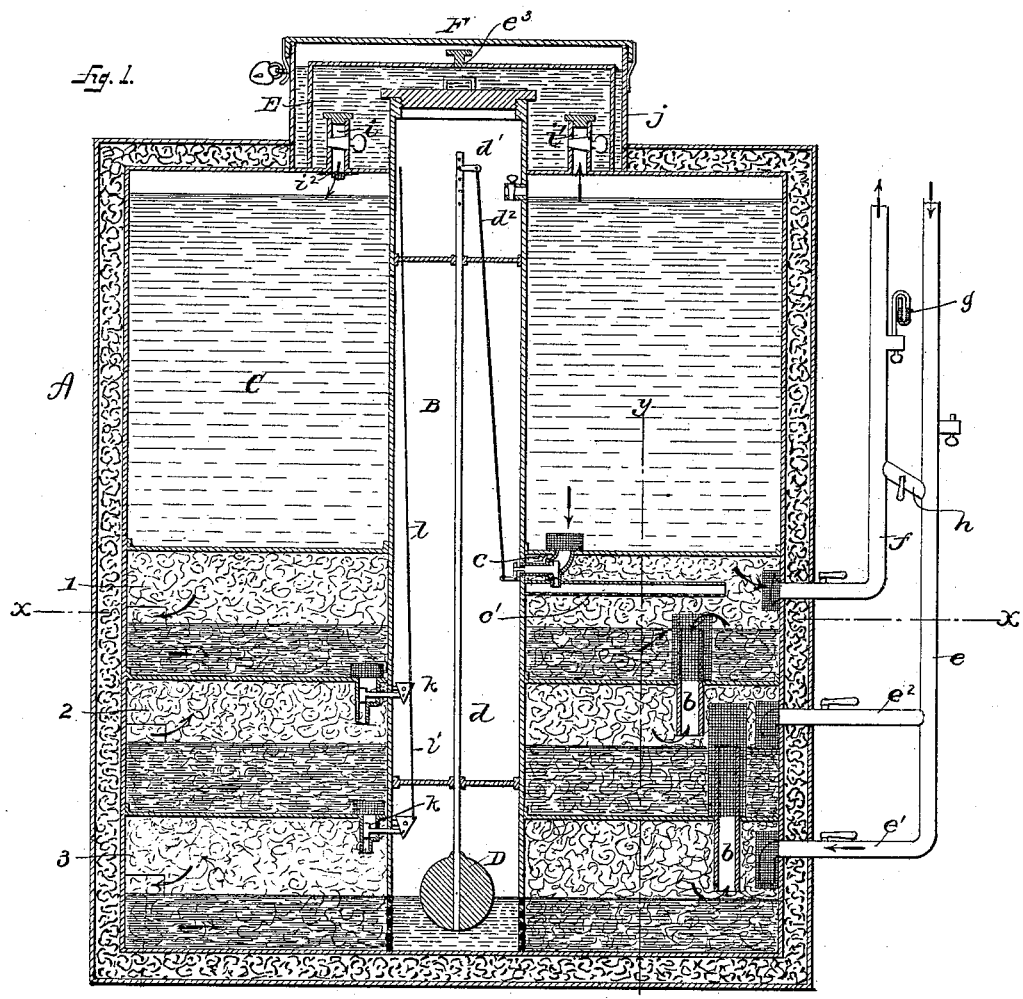
Figure 2:
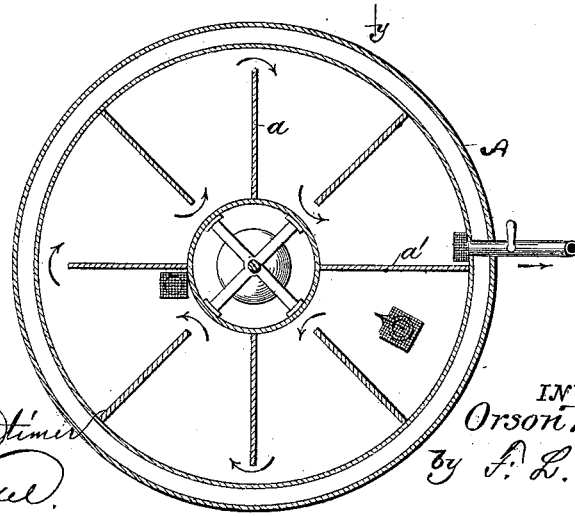
Figure 3:
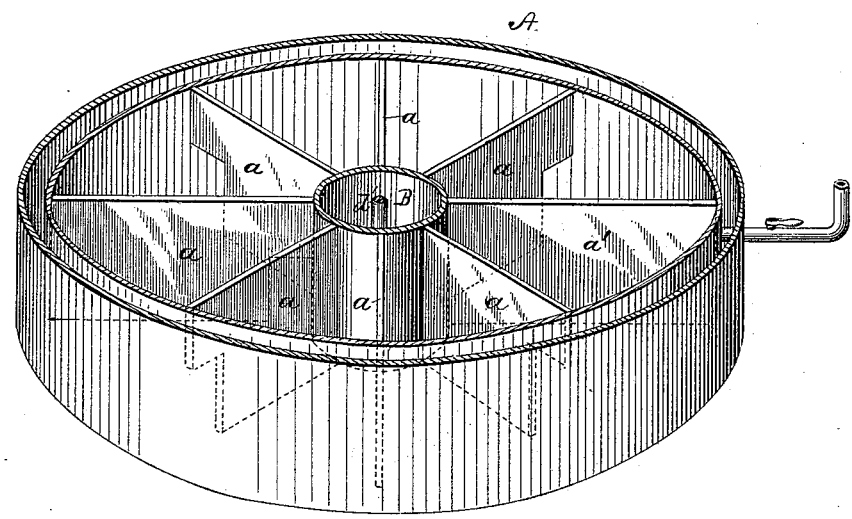
Figure 4:
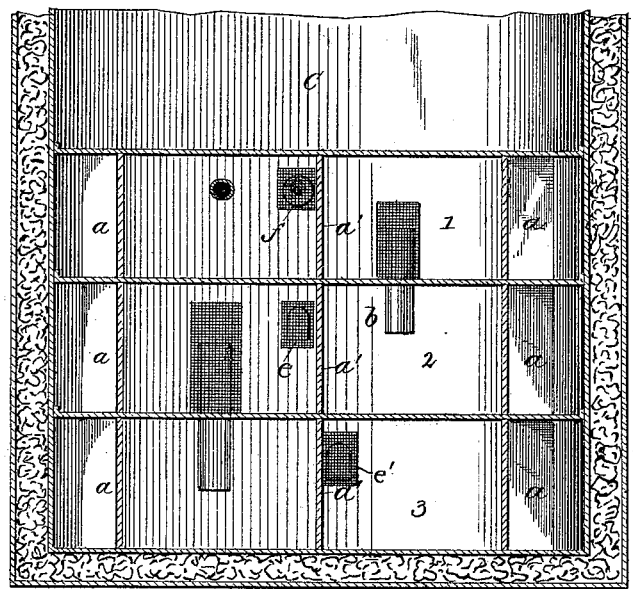

In the accompanying drawings, in which like letters of reference indicate corresponding parts, Figure 1 represents in vertical longitudinal sectional view an apparatus embodying my improvements. Fig. 2 is a section taken on a horizontal plane indicated by the line $x\ x$. Fig. 3 is a detail perspective of one of the generating-chambers, the better to illustrate the interior construction and arrangement of the vertical partitions. Fig. 4 is a longitudinal sectional view on line $y\ y$, Fig. 1.

The letter A designates an outer double-walled vessel, made of copper or other non-corrosive material. This vessel is preferably of cylindrical form, and is provided between its walls with a packing of any suitable material or materials forming a good non-conductor of heat. I have found that ashes and asbestus or plaster-of-paris make a good packing for the purpose. Within this vessel, and extending longitudinally therewith, is a central well or tube, B, which has its lower end perforated, to permit the free flow of oil thereinto from the main vessel A, and its upper end provided with a suitable cover or cap, preferably screw-threaded thereon. The lower half of the vessel A is divided into two or more chambers or compartments, constituting what I denominate "generating-chambers." These chambers are numbered in the drawings 1, 2, and 3, and each is divided by vertical walls $a$, of the form shown, extending radially from the wall of the central well, B, to that of vessel A. The several chambers 1, 2, and 3 are made to communicate by means of short tubes $b$, each of which projects above and below the partition in which it is secured. The open ends of these tubes $b$ may be covered with gauze or similar material. The upper half of the vessel constitutes the hydrocarbon chamber or reservoir C, which has at its bottom a valved outlet, $c$. The valve of this outlet is operated by the float D, located at the bottom of the well B. This float has extending upward from it a rod, $d$, attached to one end of a short lever, $d'$, fulcrumed in the well B. The other end of the lever $d'$ is connected with the lever operating the valve-stem by means of a rod, $d^2$. The outlet $c$ is provided with a perforated spraying pipe or trough, $c'$, extending horizontally into the chamber.

A gas or air supply pipe, $e$, communicates by means of branches $e'$ and $e^2$ with the two chambers 2 and 3 nearest the bottom of the vessel A. The branches are provided with suitable cocks for opening and closing said pipes. The outlet-pipe $f$ communicates with the upper chamber, 1. This pipe is also fitted with a suitable stop-cock to regulate or cut off the flow of gas from the carburetor, and upon these pipes I may also secure an indicator, $g$, to indicate the relative pressure of the gas in its entrance into and exit from the apparatus. The ends of the pipes which open into the generating-chambers may also be covered with wire-gauze. The two pipes $e$ and $f$ are made to communicate through a short pipe, $h$, which is also fitted with a suitable stop-cock. The upper end of the hydrocarbon-chamber is provided with two openings, fitted with short tubes $i$ and $i'$, each of which is provided with stop-cocks. One of these tubes is the supply-tube, or that through which hydrocarbon oil is supplied to the reservoir, and the other an outlet for the escape of air or gas as the oil is supplied to the reservoir. The feed-pipe $i$, as shown, is fitted with a strainer, $i^2$, to catch impurities or particles of matter which should not go into the reservoir. A wall, $j$, connected by a liquid-tight joint to the top of the vessel A, surrounds the space including these tubes $i$ and $i'$ and the upper end of the central well, B, and into the space thus surrounded water or other suitable air or gas sealing liquid is poured until it submerges the said tubes and upper end of the well B, after which another cover, E, provided with a vent, $e^3$, adapted to be opened and closed by any suitable means—as, for example, a screw-plug—is placed over the parts. The vent $e^3$ permits the escape of air which may be within the cover when the same is placed into the water over the tubes $i$, $i'$, and B, before mentioned. This construction renders the admission of air to or the escape of gas from the vessel impossible. The opening to the space inclosed by the wall $j$ may be closed by means of hinged cover F, provided with a suitable locking or fastening device.

In order that the residuum in the upper chambers of the apparatus may be removed, I provide each of the chambers 1 and 2 with valved openings $k$. The stems of the valves in the openings $k$ have their operating-levers connected to rods $l$ $l'$. The levers for operating these valves are so arranged that their weight, together with that of the rods $l$ $l'$, will tend to hold the valves so that the openings will be closed, and are only opened by the lifting or raising of the rods $l$ $l'$. This opening by the valves will allow all the residuum in the generating-chambers to flow down to the lower one or to the bottom of the vessel, from whence the residuum may be pumped or otherwise removed therefrom through the well-tube B. The openings $k$ may also be provided with a wire-gauze or similar covering.

The several generating-chambers may be filled with asbestus fiber, excelsior, or other absorbent material to be saturated with the hydrocarbon oil.

The operation of the gas-generator, constructed as herein shown and described, will be as follows: When the reservoir or chamber C is supplied with oil, it will flow through the outlet $c$ until the chamber 1 is supplied to a level with the upper end of the tube $b$, through which it will flow to the next, and so on to the last chamber, 3. The oil flows into the chamber 3 until the float is raised sufficiently to cause the valve in the outlet $c$ to close said outlet. The height to which the float shall be raised will be determined by the depth of oil desired in the lower chamber, and for this purpose the upper end of the rod $d$ is made with a series of holes, through which a pin or other device may be passed to secure it to the lever $d$. The oil, as before described, is poured through the cock or tube $i$, and this, of course, before the water is supplied to seal the joints. The air or gas coming through the pipe $e$ may be made to pass first into chamber 3, through which it will pass over the surface of the oil and through the saturated absorbent by a circuitous route to the lower end of the tube B, on the other side of the partition $a'$, which separates the inlet portion of the chamber from the outlet. This partition, being a complete one, compels the air or gas to take a circuitous route in order to pass to the next chamber. In the chamber 2 the same operation takes place, excepting that the gas flows in the opposite direction. The generated gas or air finally reaches the mouth of the outlet-pipe $f$, when it is ready for use. When it is desired that the air or gas be not so highly charged, the branch pipe $e'$ is closed and the pipe $e^2$ opened; or the air or gas may be admitted to the apparatus through both the branches or through the lower one only.

It will be seen that the supply of oil to the several generating-chambers is automatically regulated, and that the apparatus will need no further handling after the reservoir is once filled until the supply therein is exhausted.

Having thus described my invention, what I claim, and desire to secure by Letters Patent, is—

1. The herein-described improved gas-generator, comprising the vessel A, having a central well or tube, B, extending the entire depth of the vessel, whereby easy access is had to the interior thereof, horizontal partitions dividing the lower portion of the vessel into generating chambers or compartments, the upper portion, through which the central well, B, extends, constituting the oil-supply reservoir, a valved outlet from said reservoir into the upper part of said generating chambers or compartments, and automatically-operating devices located in said well for controlling the supply of oil to the chambers, as set forth.

2. A gas-generator, substantially as described, comprising the vessel A, having the central well with automatic oil-supply-regulating devices located therein, and its upper portion constituting the oil-reservoir and its lower portion constituting the generator, divided by partitions into horizontal chambers or compartments, the tubes $b$ in said partitions, extending above and below the same, the vertical walls $a$, extending from top to bottom of the chambers or compartments, and from the wall of the well B to the wall of the vessel A, provided with openings occurring alternately at the walls of the well and vessel, for the purposes described, the solid portion $a'$ in said compartment, an inlet upon one side and an outlet upon the other, and pipes leading to and from said compartments outside of the vessel and central well, substantially as shown and described.

3. The combination, with the vessel having the central well or tube, B, provided with a removable and adjustable gas tight cover, and the reservoir C, with vents provided with suitable stop-cocks and strainer, of the wall $j$, surrounding and inclosing the space occupied by the said stop-cocks and the upper end of the well or tube, the said inclosed space to receive water or other air and gas sealing liquid to submerge the stop-cocks and the upper end of the well-tube, substantially as and for the purpose described.

4. In a gas-generator comprising the vessel A, well B, and generating-chambers, the partitions forming said generating-chambers, provided with openings to permit the flow of the liquid residuum of hydrocarbon from said chambers, combined with valves arranged to close said openings, connected with and operated by rods in the well-tube B, substantially as and for the purpose set forth.

In testimony whereof I affix my signature in presence of two witnesses.

ORSON W. BENNETT.

Witnesses:
CARRIE M. SWETT,
F. L. BROWNE.